(12) United States Patent
Krenzler

(10) Patent No.: US 6,579,039 B2
(45) Date of Patent: Jun. 17, 2003

(54) SUBMERGIBLE TIRE STRUCTURE

(76) Inventor: Leo M. Krenzler, 20603 Island Parkway E, Sumner, WA (US) 98390

( * ) Notice: Subject to any disclaimer, the term of this patent is extended or adjusted under 35 U.S.C. 154(b) by 64 days.

(21) Appl. No.: 09/770,324

(22) Filed: Jan. 26, 2001

(65) Prior Publication Data

US 2002/0100529 A1 Aug. 1, 2002

(51) Int. Cl.[7] .............................. E02B 3/04; A01K 61/00
(52) U.S. Cl. .............................. 405/25; 405/21; 405/15; 119/222
(58) Field of Search .................... 405/15–35; 119/200, 119/221, 222

(56) References Cited

U.S. PATENT DOCUMENTS

| | | | | | |
|---|---|---|---|---|---|
| 4,150,909 | A | * | 4/1979 | Hibarger et al. ............. | 405/27 |
| 4,196,694 | A | * | 4/1980 | Buchanan .................... | 405/16 |
| 4,334,499 | A | * | 6/1982 | Baass .......................... | 405/23 |
| 5,024,560 | A | * | 6/1991 | Reilly .......................... | 405/33 |
| 5,238,325 | A | * | 8/1993 | Krenzler ...................... | 405/25 |
| 5,370,476 | A | * | 12/1994 | Streichenberger ............ | 405/15 |
| 5,645,371 | A | * | 7/1997 | Marzullo ..................... | 405/15 |
| 5,807,023 | A | * | 9/1998 | Krenzler ...................... | 405/21 |
| 6,213,687 | B1 | * | 4/2001 | Broughton et al. ........... | 405/21 |

* cited by examiner

*Primary Examiner*—Heather Shackelford
*Assistant Examiner*—Frederick L. Lagman
(74) *Attorney, Agent, or Firm*—Delbert J. Barnard

(57) ABSTRACT

A weight (18) is set into the lower portion of an annular space (34) in a tire (16). The weight (18) may be a precast concrete member shaped to fit into and extend chordwise of the annular space (34). The weight (18) is wider than the distance between the tire sidewalls (24, 26). When inserted into the tire (16), the weight (18) pushes the sidewalls (24, 26) apart and flattens the bottom portion of the tread (32). The weight (18) at the bottom of the tire (16) and an air space (48) at the top of the tire (16) act together to hold the tire (16) in a substantially upright position. Corrodible iron inserts may be added to the tire (16).

6 Claims, 5 Drawing Sheets

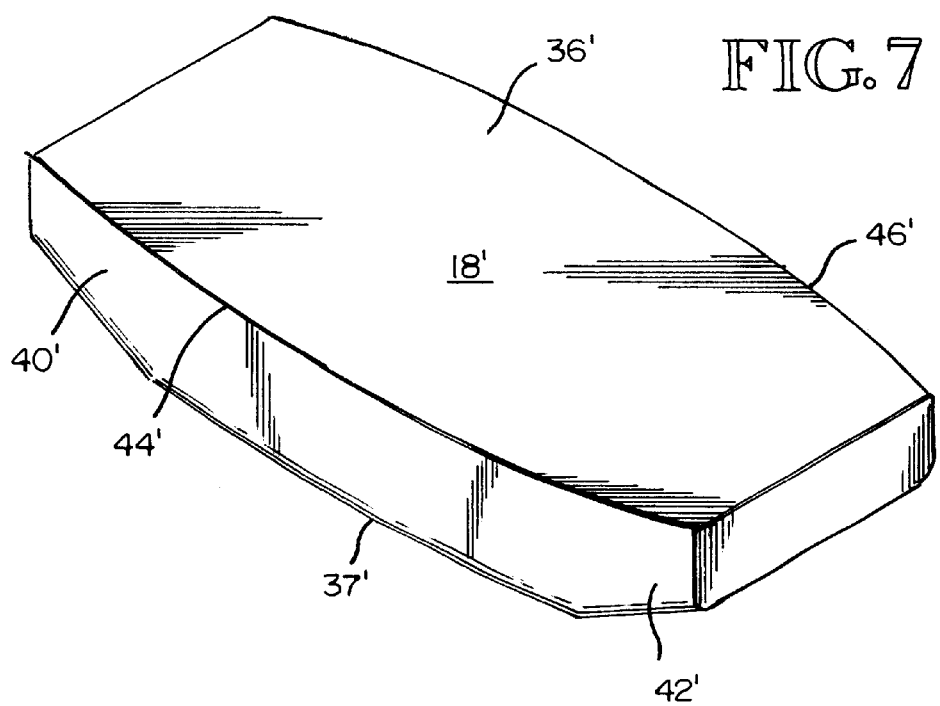
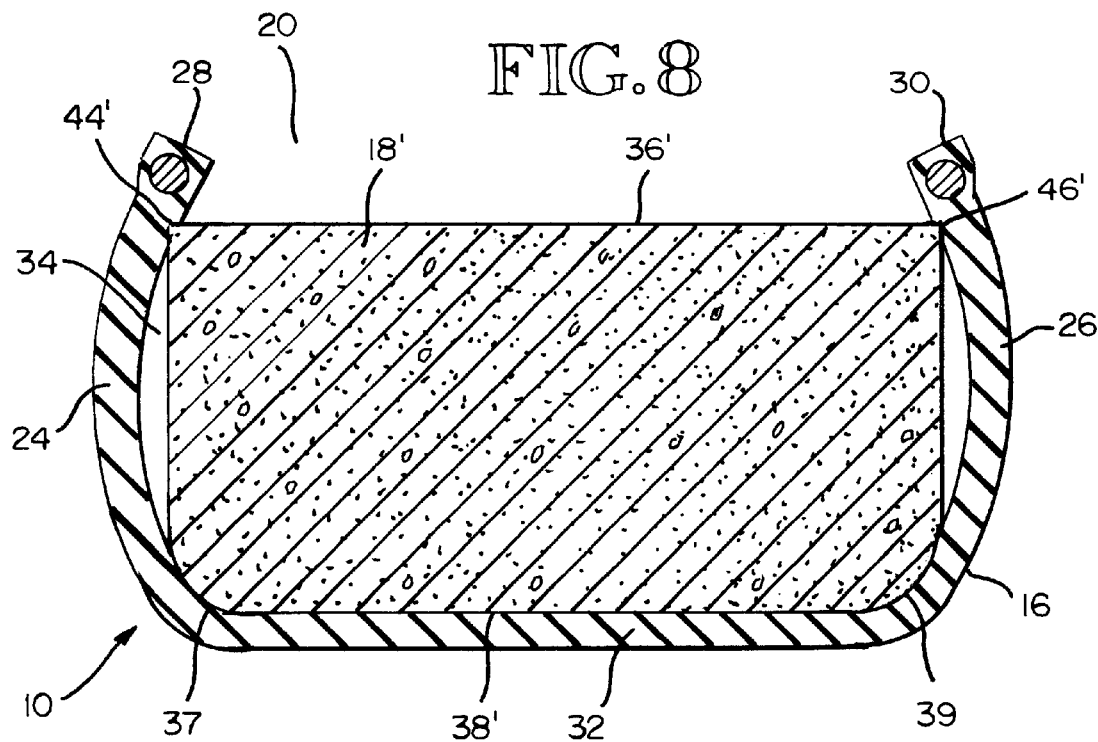

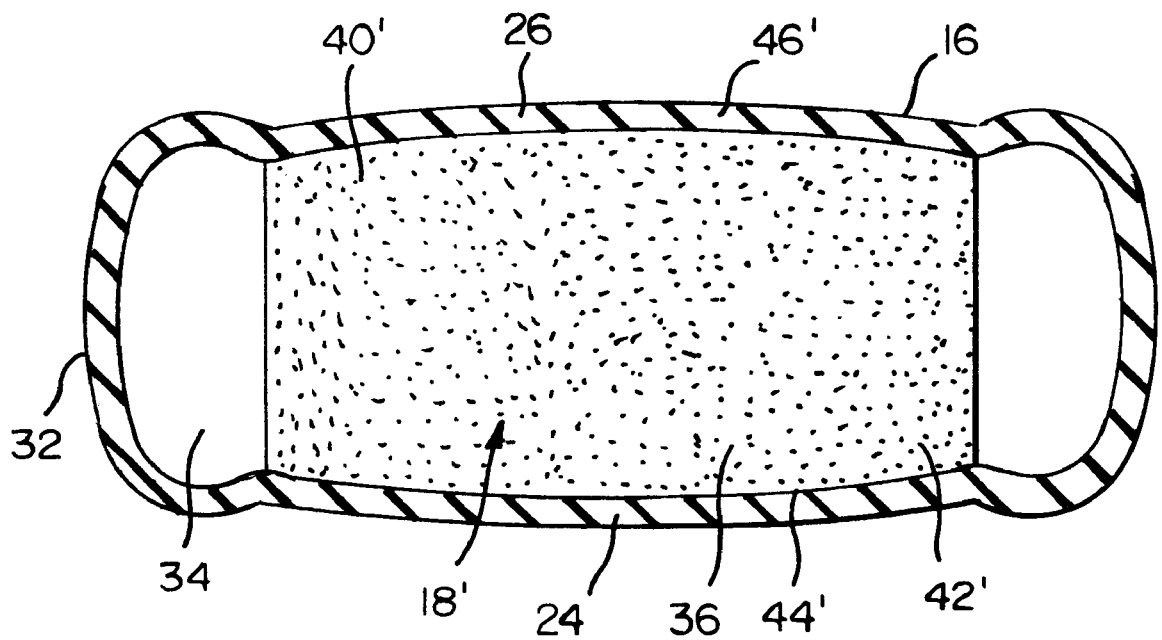

SUBMERGIBLE TIRE STRUCTURE

TECHNICAL FIELD

The present invention relates to a submergible tire structures. More particularly, it relates to a submergible tire structure that includes a weight in the lower portion of the tire that is sized and placed so that it holds the tire in a substantially upright position. One use of the submerged tire is the provision of a safe haven for marine life. Another use is for beach or bank stablization.

BACKGROUND OF THE INVENTION

It is now well known to use old tires to form underwater and shoreline structures for a number of uses. For example, my U.S. Pat. No. 5,238,325, granted Aug. 24, 1993 and my U.S. Pat. No. 5,807,023, granted Sep. 15, 1998, both relate to artificial reef structures made from old tires.

Other United States patents disclosing various ways of making artificial reef structures from old tires are disclosed by U.S. Pat. No. 3,928,701, granted Dec. 23, 1975, to Soll Roehner; U.S. Pat. No. 4,196,694, granted Apr. 8, 1980 to Robert R. Buchann; U.S. Pat. No. 4,334,499, granted Sep. 15, 1982 to Alan J. Baass; U.S. Pat. No. 5,024,560, granted Jun. 18, 1991, to Joseph W. Riley; U.S. Pat. No. 5,370,476, granted Dec. 6, 1994, to Rodolophe Streichenberger, and by Russian Patent No. 88-076424/11, published Aug. 15, 1987.

Breakwater structures formed from old tires are disclosed by the following U.S. Pat. No. 3,884,042, granted May 20, 1975, to Thomas R. Anderson and Edwin E. Fortner; U.S. Pat. No. 3,934,540, granted Jan. 27, 1976 to A J Bruner, Edward T. Visher; U. S. Pat. No. 4,139,319, granted Feb. 13, 1979 to Emmett C. Anderson; U.S. Pat. No. 4,150,909, granted Apr. 24, 1979 to George E. Hibarger, George G. Hibarger and David W. Daniel; U.S. Pat. No. 4,188,153, granted Feb. 12, 1980, to John E. Taylor; and by Russian Patent No. SU 1476-041, published Jan. 7, 1987; Russian Patent No. SU 1,511,313, published Sep. 30, 1989 and Russian Patent No. SU 1,546,540, published Mar. 17, 1988.

Most of the structures disclosed by the above patents are relatively complex structures and are difficult to handle and place. It is an object of the present invention to provide a simple way of providing submergible structures that are easy to handle and place. In its simplest form, the invention involves use of a single weighted tire. It also includes using the weighted tires in groups.

BRIEF SUMMARY OF THE INVENTION

A submergible tire structure of the present invention is basically characterized by a vehicle tire and a weight for holding the tire in a substantially upright position. The tire has opposite side openings, opposite sidewalls radially outwardly of and surrounding the side opening, and a tread radially outwardly of and surround the sidewalls. The sidewalls include rims that border the side openings. The sidewalls and tread together define an annular chamber in the tire. According to the invention, the weight is positioned in and extends chordwise of a lower portion of the annular chamber, above a bottom portion of the tire tread. The weight is wider than the distance between the sidewalls when the tire is unstressed. The weight is dimensioned and shaped such that it spreads and holds apart the sidewalls and causes the lower portion of the tread below the weight to flatten out. The sidewalls engage portions of the weight to hold the weight in the tire.

In preferred form, the weight is a pre-cast concrete member having a top of a predetermined length, a bottom of a shorter length and ends that slope downwardly and inwardly from the top to the bottom.

The invention includes providing a tire with a weight in the form of an insert that fits into a lower portion of the annular chamber in the tire. The upper portion of the annular chamber is open space. As a result, air is trapped in the space when the tire is placed into a body of water and allowed to sink down into and settle on the bottom of the body of water.

The present invention also includes providing a weight in the form of an insert for the tire that includes edge surfaces that engage sidewall portions of the tire, causing the sidewall portions to bend outwardly and store spring energy in the sidewalls that hold the sidewalls against the edges.

Another aspect of the invention is to provide such a weighted tire with at least one corrodible iron insert in the tire above the weight. In preferred form, the tire is provided with a plurality of corrodible iron inserts.

It is also a part of the present invention to place two (and perhaps more) tires that are weighted at their bottoms by inserts in a side-by-side relationship and place them together in a body of water.

BRIEF DESCRIPTION OF THE SEVERAL VIEWS OF THE DRAWING

Like reference numerals and letters refer to like parts throughout the several views of the drawing, and:

FIG. 7 is a view like FIG. 2, but showing a modified construction of the weight;

FIG. 8 is a view like FIG. 4, but showing the weight of FIG. 7; and

FIG. 9 is a view like FIG. 5, but showing the modified weight.

DETAILED DESCRIPTION OF THE INVENTION

Figure 1:
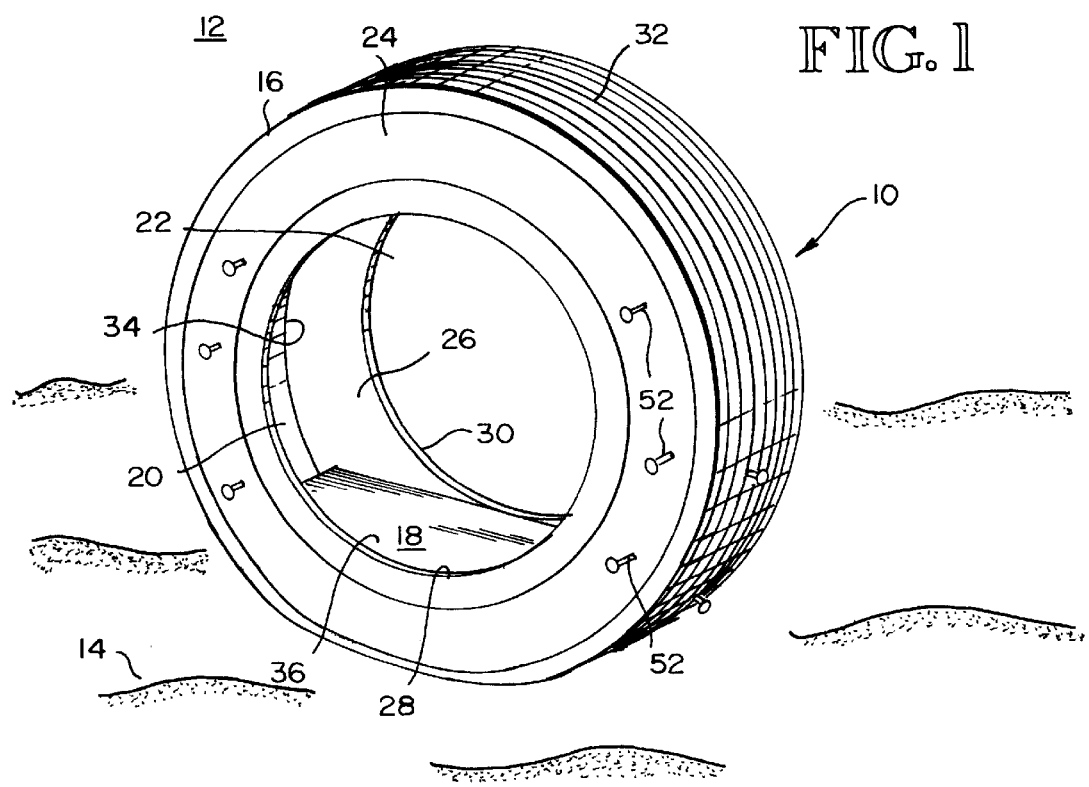
FIG. 1 is a pictorial view showing a single tire submerged in a body of water and held in a substantially upright position by the weight in the form of an insert into a lower portion of the tire.
Figure 2:
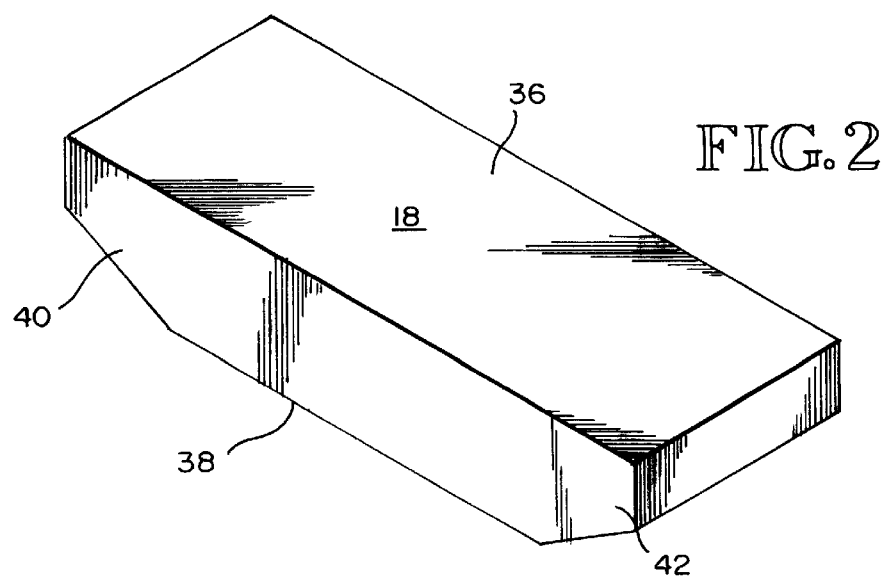
FIG. 2 is a pictorial view of an insert weight by itself, such view looking from above towards the top, one end and one side of the insert weight.

FIG. 1 shows a submergible tire structure 10 submerged in a body of water 12 having a bottom 14. The structure 10 comprises a used vehicle tire 16 and a weight 18. Tire 16 has opposite side openings 20, 22 and opposite sidewalls 24, 26 radially outwardly of and surrounding the side openings 20, 22. The sidewalls 24, 26 include rims 28, 30 that border the side openings 20, 22. Tire 16 also includes a tread 32 radially outwardly of and surrounding the sidewalls 24, 26. The sidewalls 24, 26 and the tread 32 together define an annular chamber 34 in the tire 16.

Figure 4:
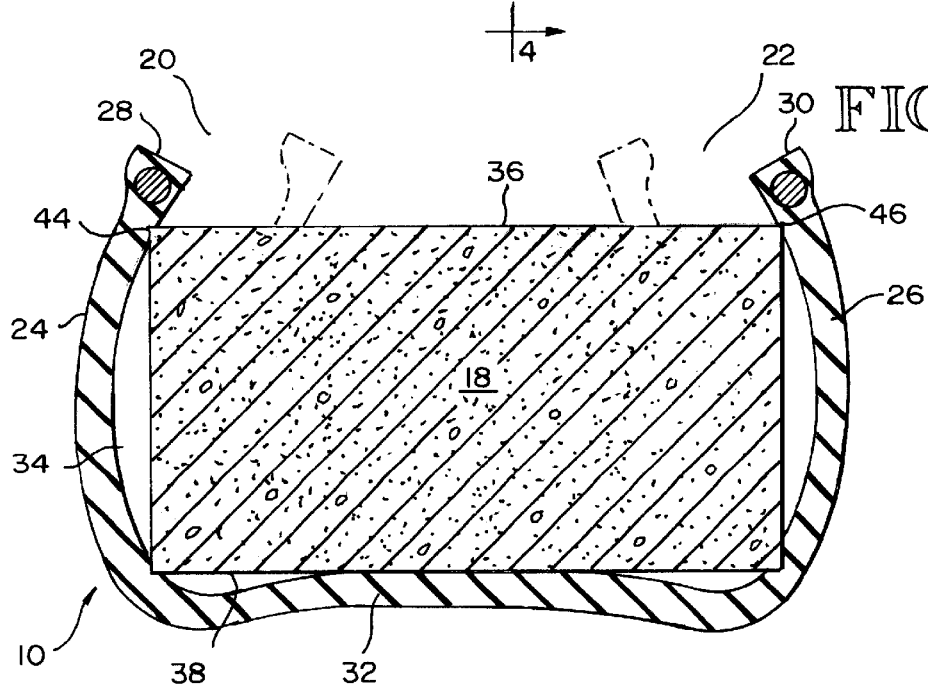
FIG. 4 is a sectional view taken substantially along line 4—4 of FIG. 3, such view showing the weight positioned in the tire, the lower sidewall portions of the tire being held apart by the weight and the bottom of the tire being bowed upwardly by the action of the weight on the sidewalls of the tire.
Figure 5:
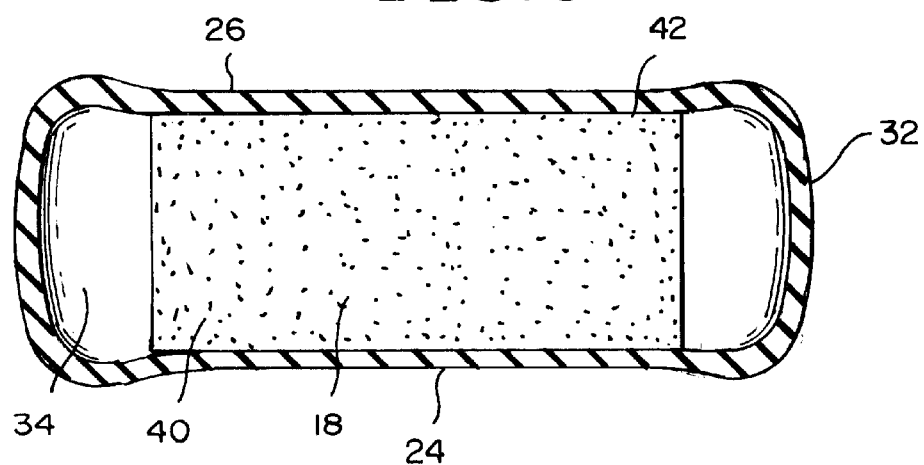
FIG. 5 is a sectional view taken substantially along line 5—5 of FIG. 3, presenting a top plan view of the weight.

The weight 18 is an insert for the annular space 34. Preferably, the weight is a precast concrete member having a top 36, a bottom 38 and end portions 40, 42 that slope downwardly and inwardly from the top 36 to the bottom 38. The top 36 has a predetermined length. The bottom 38 has a shorter length. The weight 18 is dimensioned such that when it is placed into the lower portion of the annular chamber 34, it will extend chordwise of the lower portion of the annular chamber 34. The weight 18 is at least in part wider than the distance between the sidewalls 24, 26 when the tire is unstressed. As a result, two things happen when the weight 18 is inserted into the bottom portion of the tire 16. Firstly, the tire sidewalls 24, 26 are moved apart so as to provide room for the weight 18. Secondly, the bottom portion of the tread 32 is bowed upwardly and "flattened". These two things store energy in the tire that wants to return the sidewalls 24, 26 to their initial unstressed positions. Because the weight 18 is inside the tire, the sidewalls 24, 26 are instead moved into engagement with opposite side portions of the weight 18. In the illustrated embodiment, this consists of upper corner regions 44, 46. Corner regions 44, 46 are relatively sharp and will tend to dig into the tire material. FIG. 4 includes broken lines showing the static position of the tire.

Figure 3:
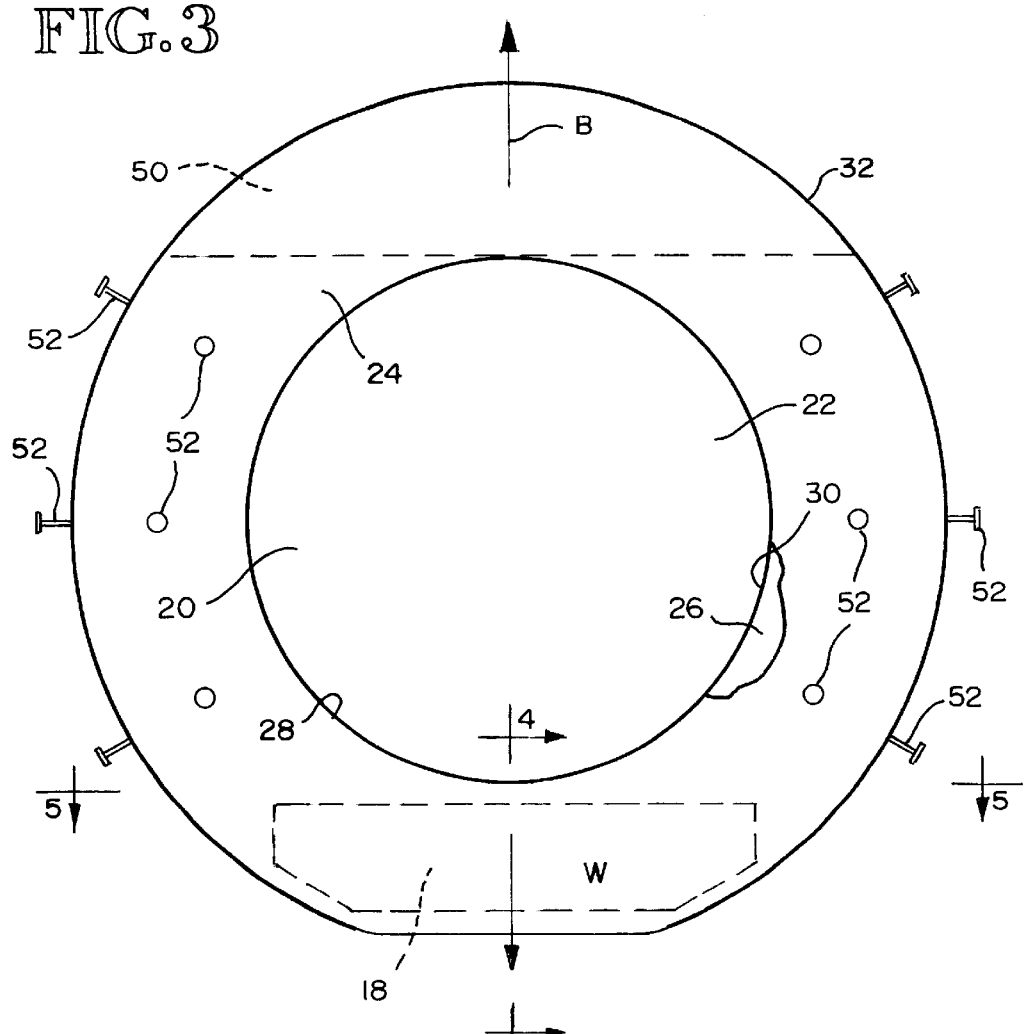
FIG. 3 is a side elevational view of the tire and weight, such view showing that the tire has a flattened bottom.

As shown by FIGS. 3 and 4, the bottom surfaces of the weight end portions 40, 42 and the weight bottom 38 substantially conform to the shape of the inside of the tire 16. Herein, the term "flattened" is used to describe the condition of the bottom of the tread 32, does not require the presence of a planar surface. Rather, it describes a condition of the tire tread 32 being reconfigured from a round or rounded shape to a shape similar to what appears at the bottom of a flat tire. In embodiments wherein the weight 18 is properly configured, it will be lodged relatively tightly into the lower portion of the annular space 34 and the contact between the weight 18 and the inner surfaces of the annular space 34 will substantially lock the weight 18 into the annular space 34 and make it difficult for the weight 18 to be inadvertently dislodged from the tire 16.

FIGS. 7–9 show the weight 18' configured to more closely conform to the inside shape of the tire whose sidewalls have been spread apart by means of a mechanical tire spreader such as is used in tire installation and repair shops. This spreader grasps the sidewalls of the tire and pulls them and holds them apart so as to create an enlarged cavity where the spreading occurs. The weight 18' is provided with rounded surfaces that face towards the inside of the tread portion of the tire. As a result, the weight 18' can be forced into the tire with its lead surface pressing against the inside of the tire tread, moving it outwardly to the extent possible permitted by the tire itself. Tires are constructed to be relatively strong, particularly in the tread region. The weight 18' is forced radially into the annular space 34 with its leading surface against the inside surface of the tire tread. The rounded corners on the leading side of the weight 18' help the weight 18' move into the tire. They also do not interfere with the weight 18' moving against the tread portion 32 and moving it outwardly. The edges 44, 46 of the weight 18' continue to dig into the inside portions of the sidewalls 24, 26. They prevent the weight 18' from inadvertently moving back out from the cavity space 34.

The weight 18 causes the tire 16 to take a substantially upright position when it is placed into the body of water 12.

Except in the region of the weight 18, the annular chamber 34 is composed of open space. When the tire structure is submerged into the body of water 12, air 50 is trapped in the upper portion of the annular chamber 34. As the tire 16 is lowered in the water, water will move into the side openings 20, 22 until the openings 20, 22 are completely below the water line. At that time, air 50 that is trapped in the tire 16 will continue to be trapped and will provide some buoyancy for the upper portion of the tire 16. The buoyancy will cause the tire to make a slow descent downwardly through the water to the bottom. The resultant of the buoyancy force is shown by arrows in FIGS. 3 and 6, labeled B. The buoyancy at the top and the weight at the bottom will both function to hold the tire structure in a substantially upright position.

Figure 6:
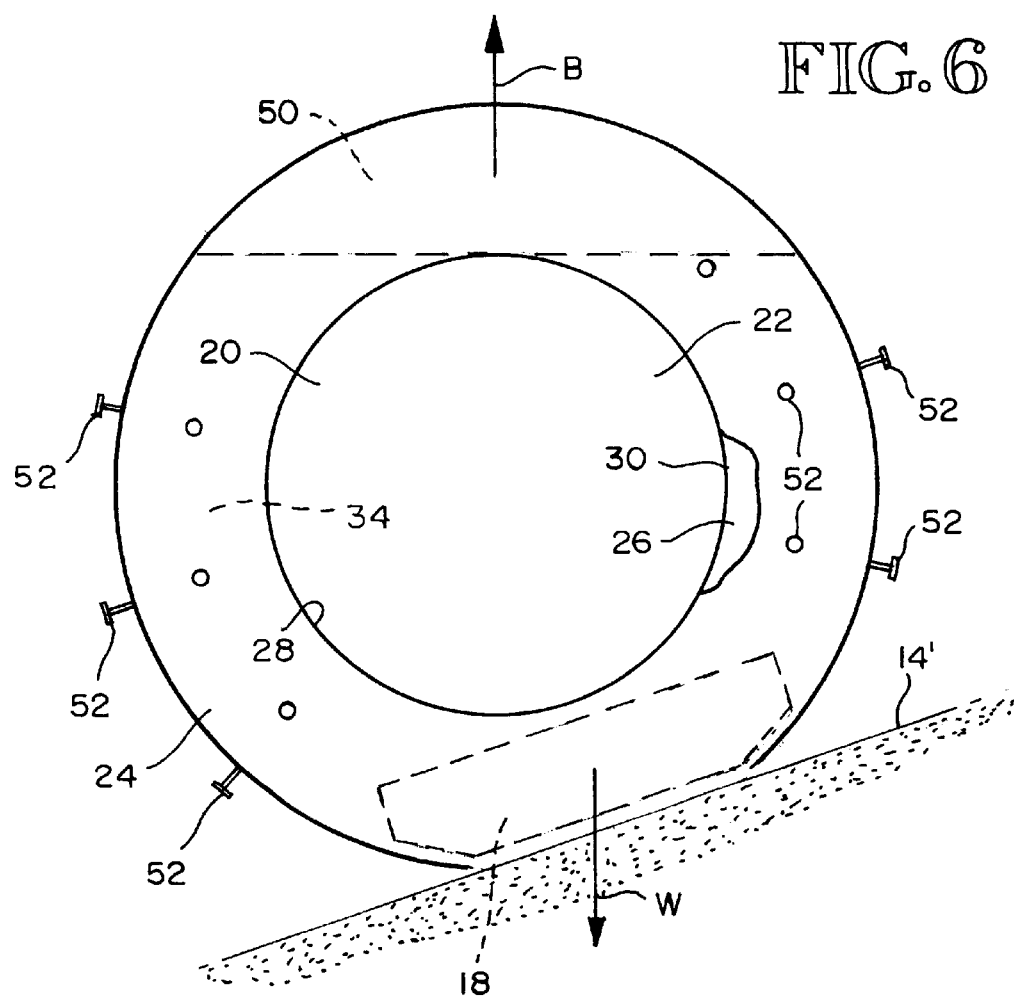
FIG. 6 is a view like FIG. 3 but showing the weighted tire resting on a sloping bottom surface.

FIG. 6 shows that the tire will remain upright even when placed on a sloping bottom surface 14'. The bottom of the tire structure 16 will dig into the bottom surface 14' a sufficient amount to keep the tire structure 16 from sliding down the bottom surface 14'. The trapped air 50 and the weight 18 will together keep the tire structure 16 from tipping sideways and from rolling down the bottom surface 14'. The resultant of the weight force is shown by arrows in FIGS. 3 and 6, labeled W.

FIGS. 7–9 show a modified construction of the weight 18'. In this embodiment, the weight 18' is longitudinally curved on both sides. Also, the lower edge surfaces 37, 39 are laterally rounded. See FIG. 8. As a result, the weight 18' can be placed inside of the tire 16 and pushed downwardly until its flat bottom region 38' contacts the inside surface of the tire tread region 32. The weight 18' can be further forced downwardly to cause the flat surface 38' to substantially flatten the tread 32. FIGS. 4 and 6 both show what is herein referred to as a "flattened" condition of the tire. FIG. 8 shows a more true flat while FIG. 4 shows the tread 32 bowed upwardly somewhat. The rounded nature of the corners 37, 38 serve to cam the weight 18' as it is pushed downwardly, allowing its flat bottom surface 38' to contact and flatten the tire tread 32. The upper edges 44', 46' continue to be sharp so that they will dig into the inside of the tire sidewalls 24, 26 and restrain the weight 18' from moving back out of the tire 16. The longitudinal curvature of the sides of the weight 18' more closely conforms to the shape of the cavity in the lower portion of the tire 16 when the sidewalls 24, 26 are spread apart. The present invention includes constructing the weight so that it closely conforms to the three dimensional shape of the cavity in the lower portion of the spreaded part tire 16. Also, the weight 18' can be longer and the bottoms of the end portions 40', 42' can be curved and can extend outwardly and upwardly further than what is shown.

In preferred form, the tire 16 is provided with at least one, but preferably a substantial number of, corrodible iron inserts, some of which are designated 52. The inserts 52 can be provided in the tire 16 or only in the upper portion of the tire 16. As is known from my aforementioned U.S. Pat. No. 5,807,023, once the tire structure 10 is submerged, the insert or inserts 52 will corrode to promote phytoplankton growth over a period of time. The insert or inserts 52 may be in the form of nails, or a nail-like structure, that is set into the tire 16 by use of a power nailer. See for example, FIG. 4 of U.S. Pat. No. 5,807,023. The disclosure of U.S. Pat. No. 5,807,023 is hereby expressly incorporated herein, particularly for its description of the function and advantages of the corrodible inserts. It is a part of the invention that different corrodible metals can be used for the inserts so as to provide a time release of the by-products of corrosion. In other words, some inserts may be made from a metal that corrodes relatively fast. Others may be made from a metal that corrodes very slowly. Still others may be made from metals that corrode at intermediate rates.

In some uses of the submergible tire constructions it may not be desirable for the tires to trap air and be buoyant. To prevent buoyancy from happening, a lateral cut can be made through the upper portion of the tire. Buoyancy will not be helpful when the tire structure is used as a breakwater for bank and beach stabilization, etc.

The weights 18 are precast and may be made from excess concrete remaining in ready mix trucks when they return to the ready mix plant. A system of inserting the weights into the tires can be easily automated. Conveyors can bring both the tires and the weights to a workstation whereat the weights are inserted into the tires. Conveyors can then convey the weighted tires onto a vehicle or into storage, etc. A barge can be used for setting the tire structures into the water.

The present invention includes providing a pair of weights in a single tire, at diametrically opposite locations. Referring to FIG. 3, for example, a second weight 18, 18' may be provided in the tire at the top of the tire. A tire weighted in this manner would have one or more openings or cuts made in the regions between the weights, so that air would not become trapped in these regions. A tire weighted in this manner would fall over on its side. It would be usable for erosion control on a bank or on the bottom of a body of water. Two or more of these tires can be stacked. A first layer of tires may be provided on the bottom of the body of water and then an additional layer or layers of the tires can be placed on it. Also, each upper layer tire can be rotated ninety degrees relative to the tire below it so that the weighted portions of the upper tire are above the unweighted portions of the lower tire. This arrangement would facilitate stacking of the tires. Also, some doubled weighted tires can be provided on the shore or bank and single weighted tires can be placed on the bottom of the body of wire. The single weighted tires would assume an upright position, as illustrated by FIGS. 1 and 3, for example. The double weighted tires would lay flat on the submerged bank or shore surface.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A submergible tire structure, comprising:

a vehicle tire having opposite side openings, opposite sidewalls radially outwardly of and surrounding the side openings, said sidewalls including rims hat border the side openings, and a tread radially outwardly of and surrounding the sidewalls, said sidewalls and tread defining an annular chamber in said tire;

a weight for holding the tire in a substantially upright position, said weight being positioned in and extending chordwise of a lower portion of the annular chamber, above a bottom portion of the tire tread, said weight being wider than the distance between the sidewalls when the tire is unstressed;

wherein said weight is dimensioned and shaped such that it spreads and holds apart the sidewalls and causes the lower portion of the tread below the weight to flatten out;

wherein the sidewalls engage portions of the weight and at least help to hold the weight in the tire;

wherein the weight is an insert for the tire and it includes edge surfaces that engage sidewall portions of the tire, causing the sidewall portions to bend outwardly and store spring energy in the sidewalls that holds the sidewalls against the edges; and said tire structure further including at least one corrodible iron insert in the tire above the weight.

2. The tire structure of claim 1, wherein the concrete member has a top of a predetermined length, a bottom of a shorter length, and ends that slope downwardly and inwardly from the top to the bottom.

3. A submergible tire structure, comprising:

a vehicle tire having opposite side openings, opposite sidewalls radially outwardly of and surrounding the side openings, said sidewalls including rims that border the side openings, and a tread radially outwardly of and surrounding the sidewalls, said sidewalls and tread defining an annular chamber in said tire;

a weight for holding the tire in a substantially upright position, said weight being positioned in and extending chordwise of a lower portion of the annular chamber, above a bottom portion of the tire tread, said weight being wider than the distance between the sidewalls when the tire is unstressed;

wherein said weight is dimensioned and shaped such that it spreads and holds apart the sidewalls and causes the lower portion of the tread below the weight to flatten out;

wherein the sidewalls engage portions of the weight and at least help to hold the weight in the tire; and wherein the weight is a pre-cast concrete member having a top of a predetermined length, a bottom of a shorter length, and ends that slope downwardly and inwardly from the top to the bottom.

4. The tire structure according to claim 3, wherein the annular chamber provides an open space in the upper portion of the tire, so that air is trapped in said space when the tire is placed into a body of water and allowed to sink down to and settle on the bottom of the body of water.

5. The tire structure of claim 3, further comprising at least one corrodible iron insert in the tire above the weight.

6. The tire structure of claim 4, further comprising at least one corrodible iron insert in the tire above the weight.

\* \* \* \* \*